United States Patent
Nakamura

(10) Patent No.: US 7,662,868 B2
(45) Date of Patent: Feb. 16, 2010

(54) INK-JET INK COMPOSITION

(75) Inventor: Ippei Nakamura, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/808,653

(22) Filed: Jun. 12, 2007

(65) Prior Publication Data
US 2007/0291080 A1 Dec. 20, 2007

(30) Foreign Application Priority Data
Jun. 16, 2006 (JP) ............................ 2006-167159

(51) Int. Cl.
C08F 2/48 (2006.01)
C08F 2/50 (2006.01)
C08J 3/28 (2006.01)
C09D 11/00 (2006.01)
C09D 11/02 (2006.01)
C09D 11/10 (2006.01)

(52) U.S. Cl. ................ 522/144; 522/134; 522/135; 522/145; 522/146; 522/149; 522/150; 522/157; 522/184; 522/186; 106/31.13; 106/31.27; 106/31.6; 347/100

(58) Field of Classification Search .............. 522/149, 522/134, 135, 144, 145, 146, 150, 157, 184, 522/186; 347/100; 106/31.27, 31.6, 31.13
See application file for complete search history.

(56) References Cited

U.S. PATENT DOCUMENTS

| | | | | |
|---|---|---|---|---|
| 4,023,973 A | * | 5/1977 | Imaizumi et al. | 430/286.1 |
| 4,192,684 A | * | 3/1980 | Gensho et al. | 430/284.1 |
| 5,629,136 A | * | 5/1997 | Higashi et al. | 430/272.1 |
| 6,014,929 A | * | 1/2000 | Teng | 101/456 |
| 6,140,386 A | * | 10/2000 | Vanderhoff et al. | 522/78 |
| 6,720,042 B2 | * | 4/2004 | Ylitalo et al. | 428/32.26 |
| 2002/0086914 A1 | * | 7/2002 | Lee et al. | 522/75 |
| 2004/0024078 A1 | * | 2/2004 | Itoh et al. | 522/1 |
| 2005/0197419 A1 | * | 9/2005 | Graziano et al. | 522/74 |

FOREIGN PATENT DOCUMENTS

| EP | 0 003 789 A1 | 9/1979 |
|---|---|---|
| JP | 54-117203 A | 9/1979 |
| JP | 2003-192943 A | 7/2003 |

OTHER PUBLICATIONS

Sartomer Application Bulletin, Jan. 2008.*

* cited by examiner

*Primary Examiner*—Sanza L McClendon
(74) *Attorney, Agent, or Firm*—Sughrue Mion, PLLC

(57) ABSTRACT

The present invention relates to an ink-jet ink composition, which comprises (A) a polybutadiene; (B) a radical polymerizable compound having a (meth)acryloyl group; (C) a radical polymerization initiator; and (D) a colorant. The ink composition is highly sensitive to activated radiant rays and can accordingly be cured in a high sensitivity when irradiated with the same, can maintain its flexibility even after the cure thereof and can accordingly be used suitably in the ink-jet recording method and a method for the preparation of a lithographic printing plate, to thus form printed matters and a lithographic printing plate having high printing durability.

7 Claims, No Drawings

INK-JET INK COMPOSITION

TECHNICAL FIELD

The present invention relates to an ink-jet ink composition or an ink composition for use in ink-jet recording and an ink-jet recording method as well as a lithographic printing plate obtained using the foregoing ink composition and a method for preparing such the lithographic printing plate. More specifically, the present invention pertains to an ink composition which is highly sensitive to activated radiant rays and can be cured in a high sensitivity when irradiated with the same, which can maintain its flexibility even after the cure thereof and which can accordingly be used suitably in the ink-jet recording technique, an ink-jet recording method, a lithographic printing plate obtained using the foregoing ink composition and a method for the preparation of such a lithographic printing plate.

BACKGROUND ART

There have been known the electrophotographic system, the heat transfer recording system through sublimation and melting, and the ink-jet recording system, as the image-recording techniques in which images are recorded or formed on a recording medium such as a sheet of paper on the basis of image data signals. The electrophotographic system requires the use of processes for charging a light-sensitive drum and for exposing the same with light rays to thus form electrostatic latent images and accordingly, this technique suffers from problems in that the system to be used becomes quite complicated in its structure and this in turn leads to an increase in the production cost. On the other hand, the heat transfer recording system requires the use of a cheap device, but the system uses an ink ribbon and accordingly, problems arise such that the running cost is quite expensive and this technique results in the generation of a large quantity of waste materials.

On the other hand, the ink-jet recording system requires the use of a cheap device and can directly form images on a recording medium by discharging ink onto only the desired image-forming regions of the recording medium. Accordingly, this technique would permit the effective use of the ink and result in a cheap running cost. Moreover, this recording technique never generates so much noise and therefore, this system is quite excellent as the image-recording system.

Among the ink-jet recording systems, the radiant ray-curing ink-jet recording system in which the ink is cured through the irradiation thereof with activated radiant rays such as ultraviolet rays has recently attracted special interest because the system relatively slightly gives out bad smells and the ink has a quick drying ability and the ink permits the recording of images even on a recording medium free of any ink-absorbing ability. In particular, the UV-curing ink-jet recording system which makes use of a solvent free-ink composition without using any solvent has recently attracted special interest, from the viewpoint of the protection of the working environment and the control of discharging VOC (Volatile Organic Compound) as well as the viewpoint of the ability of forming images within a short period of time without passing through any additional step such as a drying step. In the ink-jet recording system, however, the ink should be discharged through a quite fine nozzle (having a diameter ranging from, for instance, 1 to 100 μm) and accordingly, it would be quite important that the ink composition used has a viscosity value falling within a predetermined range (for instance, a viscosity ranging from 5 to 50 cP at a discharge temperature of 25° C.).

For this reason, the ink-jet recording system requires the use of an ink composition which never requires the use of any solvent (a solvent-free type ink composition) and which has an appropriate viscosity value at the same time.

In addition, the radiant ray-curing ink-jet recording system should be cured at a high sensitivity and would permit the formation of high quality images. In other words, it would be necessary in the radiant ray-curing ink-jet recording system that images should be irradiated with radiant rays within a very short time period (for instance, 0.01 to 0.5 seconds) after the impact of such an ink composition on a recording medium to thus cure the ink composition before the recording medium is never blurred with the ink, but this requires the use of an ink composition having a quite high sensitivity (very fast curing rate). Moreover, the ink composition is discharged from the ink-jet recording device in the form of droplets and therefore, the ink suffers from such problems that it is quite susceptible to the polymerization-inhibitory effect of oxygen and that the sensitivity thereof is in turn impaired. A high curing ability encountered when irradiated with activated radiant rays can be imparted to an ink composition through the improvement of the sensitivity thereof and the improvement of the sensitivity would likewise permit the achievement of other various advantages such as an increase of the life time thereof through the reduction of electric power consumption and the reduction of any load applied to the radiant ray-generator, and the control of the volatilization of any uncured low molecular weight substances and any reduction of, for instance, the strength of the resulting images. In addition, when applying the ink composition to the formation of image areas for a lithographic printing plate, the improvement of the image strength through the enhancement of the sensitivity of the ink composition would impart high printing durability to the resulting lithographic printing plate.

Accordingly, there has been desired for the development of a solvent-free type radiant ray-curable ink-jet ink composition, which has an appropriate sensitivity to radiant rays and likewise has a predetermined viscosity value.

There has been proposed a composition comprising a polymerizable compound selected from the group consisting of specific acrylate compounds (see, for instance, Patent Document 1 specified below) for the purpose of, for instance, providing a highly safe ink composition having the following various advantages: images can be formed even on supports (such as those made of polyester, polycarbonate, polypropylene or the like), whose direct recording by the ink-jet recording method is in general quite difficult, without being accompanied by any blurring of the support, at a high sensitivity, the ink composition is strongly adhered to a recording medium, and the composition is highly safe since it never causes any stimulation and any sensitization of the skin. However, the multi-functional acrylates used for the improvement of the sensitivity provide, as a result of curing, polymers each having a highly crosslinked three-dimensional structure and accordingly, the images obtained after the cure of the ink composition have insufficient flexibility and reduced impact resistance, this in turn leads to the formation of images quite susceptible to the formation of cracks and peeling off of images and accordingly, the resulting images shows insufficient durability.

Moreover, in the conventional techniques for the preparation of a lithographic printing plate, there has been adopted a method which makes use of a so-called PS plate comprising a hydrophilic substrate provided thereon with a lipophilic light-sensitive resin-containing layer and which comprises the steps of imagewise exposing the resin layer constituting the light-sensitive layer to improve or reduce the solubility of the exposed area thereof in an alkaline developer and to thus form desired images and then removing the non-image area through the dissolution thereof in the developer. However, there has recently been widely used a digital technique in which image information is electronically processed, stored and outputted using a computer, and accordingly, there has correspondingly been desired for the development of a novel image-outputting system. In particular, various attempts have been made to develop a method which can prepare a printing plate without passing it through any treatment with a developer and to develop a method for directly preparing a lithographic printing plate while using an ink-jet ink composition (see, for instance, Patent Document 2 specified below). Such a method comprises the steps of imagewise discharging an ink composition onto the surface of, for instance, a hydrophilic substrate according to, for instance, the ink-jet recording technique and then curing the ink composition through the irradiation thereof with activated radiant rays to thus give a printing plate provided thereon with a desired pattern of images (preferably hydrophobic images). To form practically acceptable image areas of a lithographic printing plate, the ink composition to be used should satisfy the following requirements: the droplets of the ink composition discharged onto the surface of a substrate can immediately be cured without being accompanied by any blurring; it can ensure the formation of cured images excellent in the strength and the adhesion to the substrate; and when fitting the resulting lithographic printing plate to a printing press, the image area can appropriately follow-up with the deflection of the substrate and never causes any defect such as a crack. Thus, there has presently been desired for the development of such an ink composition suitably used in these applications.

Patent Document 1: Japanese Un-Examined Patent Publication 2003-192943;

Patent Document 2: Japanese Un-Examined Patent Publication Sho 54-117203.

DISCLOSURE OF THE INVENTION

It is accordingly an object of the present invention to provide an ink-jet ink composition, which is for use in the ink-jet recording system, which is highly sensitive to activated radiant rays and can be cured in a high sensitivity when irradiated with the same to thus form high quality images, which can form images, after the cure thereof, excellent in the flexibility and highly adhesive to a recording medium; and an ink-jet recording method which makes use of the ink composition.

It is another object of the present invention to provide a solvent-free type, radiant ray-curable ink composition, which is highly sensitive like the conventional ink composition obtained using a multi-functional acrylate compound and which can provide images having excellent flexibility and excellent adhesion to a recording medium; and an ink-jet recording method which makes use of the ink composition.

It is a still another object of the present invention to provide a lithographic printing plate obtained using an ink-jet ink composition, which can be cured, in a high sensitivity, through the irradiation with activated radiant rays (in particular, ultraviolet rays being preferably used); and a method for the preparation of such a lithographic printing plate.

The inventors of this invention have conducted various studies to accomplish the foregoing objects, have found that an ink-jet ink composition can be obtained through the use of a polybutadiene and a radical polymerizable compound having a (meth)acryloyl group in the molecule as the polymerizable compounds to be used in the ink composition, and that the resulting ink composition can hold its high sensitivity to activated radiant rays used for curing and can ensure, at the same time, improved flexibility even after the cure thereof, an improved ability of being discharged, an improved ability of maintaining the particle shape and improved adhesion to a recording medium, and have thus completed the present invention.

More specifically, the ink-jet ink composition according to the present invention is characterized in that it comprises (A) a polybutadiene; (B) a radical polymerizable compound having a (meth)acryloyl group; (C) a radical polymerization initiator; and (D) a colorant.

The ink composition of the present invention can highly sensitively be cured through the irradiation thereof with radiant rays and the flexibility of the film formed on the surface of the ink is likewise improved and accordingly, the ink composition is suitably used in the ink-jet recording technique.

In addition, the ink-jet recording method according to the present invention is characterized in that it comprises the steps of (i-1) discharging or injecting the foregoing ink composition onto the surface of a recording medium, and (i-2) irradiating the discharged ink composition with activated radiant rays to thus cure the ink composition.

The method for the preparation of a lithographic printing plate according to the present invention is characterized in that it comprises the steps of (ii-1) discharging the foregoing ink composition onto the surface of a hydrophilic substrate or support, and (ii-2) curing the discharged ink composition through the irradiation thereof with activated radiant rays to thus form hydrophobic images consisting of the cured ink composition on the foregoing hydrophilic substrate.

The lithographic printing plate according to the present invention is characterized in that it has hydrophobic regions formed by discharging the foregoing ink composition onto the surface of a hydrophilic substrate or substrate and then curing the discharged ink composition through the irradiation with activated radiant rays.

As has been described above in detail, the present invention can thus provide an ink-jet ink composition, which can be cured, in a high sensitivity, through the irradiation with activated radiant rays to thus form high quality images which are improved in their adhesion to a recording medium and have satisfactory flexibility, as well as an ink-jet recording method which makes use of the foregoing ink composition. In addition, the present invention can likewise provide a solvent-free type ink-jet ink composition, which can be cured, in a high sensitivity, through the irradiation with activated radiant rays to thus form high quality images which are improved in their adhesion to a recording medium and have satisfactory flexibility, as well as an ink-jet recording method which makes use of the foregoing solvent-free type ink composition.

In particular, the ink composition of the present invention is one which can ensure well-balanced curing rate of the ink composition and the flexibility of the film prepared through the cure of the composition. The reason for this may be considered to be as follows:

(i) The backbone of the polybutadiene is simply composed of hydrocarbons and therefore, the polymer in itself has good flexibility; and (ii) In addition to the fact that the polybutadiene shows good reactivity because of the presence of a large number of reactive double bonds in the molecule, the reactive double bonds of the polybutadiene do not undergo any chain reaction (chain propagation), but take part in the formation of a crosslinked structure and therefore, they never form excess crosslinked structures.

BEST MODE FOR CARRYING OUT THE INVENTION

<Ink-Jet Ink Composition>

[(A) Polybutadiene]

The ink-jet ink composition or ink composition for use in the inkjet recording technique according to the present invention is characterized in that it comprises (A) a polybutadiene.

(A) The polybutadiene component suitably used herein may be any one insofar as it is a polymer having a repeating unit represented by the following general formula (I), that is, 1,2-type repeating unit:

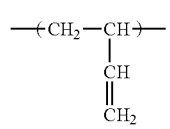

The terminal structures of the polybutadiene are preferably constituted by hydrogen atoms so as to control or reduce the viscosity of the resulting composition, but they may comprise reactive functional groups such as carboxyl, hydroxyethyl and/or isocyanate groups. The polybutadiene component may further be a terminal modified polybutadiene obtained by further modifying these reactive groups into epoxy or acryl groups. In addition to the 1,2-type repeating units, the polybutadiene may likewise comprise, as repeating units constituting the same, 1,4-type ones, but the rate of the 1,2-type one in the polybutadiene (A) is preferably not less than 15% and more preferably not less than 20% from the viewpoint of the curing rate.

The polybutadienes suitably used in the present invention may be those each having a number average molecular weight ranging from about 500 to 10,000, more preferably about 700 to 5,000 and particularly preferably about 1,000 to 3,500.

Moreover, the polybutadienes suitably used in the present invention may be those in the liquid or solid states at room temperature, but preferably those in the liquid states from the viewpoint of the solubility in the composition and the effect thereof on the viscosity of the resulting composition.

Specific examples of polybutadienes suitably used in the present invention include NISSO-PB Series such as butadiene homopolymers B-1000, B-2000, B-3000, polybutadiene glycols G-1000, G-2000, G-3000, polybutadiene dicarboxylic acid C-1000, polybutadiene having acryl-modified termini TEA-1000, TE-2000, and maleic acid-modified polybutadiene BN-1015 (these compounds are all available from Nippon Soda Co., Ltd.); syndiotactic 1,2-polybutadienes RB-810, RB-820, RB-830 (these compounds are all available from JSR Co., Ltd.); and hydroxyl termini-carrying liquid polybutadienes R-45H, R-15H (these compounds are all available from Idemitsu Industries, Ltd.), but the present invention is not restricted to these specific examples at all.

Moreover, the polybutadiene components (A) may be used alone or in any combination of at least two of them.

The content of the polybutadiene component (A) in the ink composition of the present invention preferably ranges from 2 to 25% by weight and more preferably 3 to 20% by weight on the basis of the total mass of the ink composition, while taking into consideration the balance between the curing rate and the adhesion to the substrate and the applicability thereof to the ink-jet recording technique.

(B) Radical-Polymerizable Compound Having (Meth)acryloyl Groups

The radical-polymerizable compound carrying a (meth) acryloyl group may be any compound insofar as it has at least one methacryloyl group ($CH_2$=$C(CH_3)COO$—) or acryloyl group ($CH_2$=$CHCOO$—) in the molecule and the compound includes those having any chemical form such as a monomer, oligomer or polymer form. The radical-polymerizable compounds may be used alone or in any combination of at least two of them combined at any rate for the purpose of the improvement of any specific characteristic property of the resulting composition. Preferably, at least two such radical-polymerizable compounds are used in combination for the purpose of controlling specific properties of the resulting ink composition such as the reactivity and physical properties.

Specific examples of the radical-polymerizable compound each carrying a (meth)acryloyl group include acrylic acid derivatives such as 2-ethylhexyl acrylate, 2-hydroxyethyl acrylate, butoxyethyl acrylate, carbitol acrylate, cyclohexyl acrylate, tetrahydrofurfuryl acrylate, benzyl acrylate, bis(4-acryloxy-polyethoxy phenyl)propane, neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, polypropylene glycol diacrylate, pentaerythritol triacrylate, pentaerythritol tetraacrylate, di-pentaerythritol tetraacrylate, trimethylol propane triacrylate, tetramethylol methane tetraacrylate, oligo-ester acrylate, N-methylol acrylamide, diacetone acrylamide and epoxy acrylate; and methacrylic acid derivatives such as methyl methacrylate, n-butyl methacrylate, 2-ethylhexyl methacrylate, lauryl methacrylate, allyl methacrylate, glycidyl methacrylate, benzyl methacrylate, dimethyl-aminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylol ethane trimethacrylate, trimethylol propane trimethacrylate, and 2,2-bis(4-methacryloxy-polyethoxy phenyl)propane. More specifically, usable herein likewise include commercially available ones such as those disclosed in, for instance, "Handbook of Crosslinking Agents", ed. YAMAMOTO Shinzo, 1981, Published by Taisei Publishing Company; "Handbook of UV•EB Curing (Raw Materials)", ed. KATO Kiyomi, 1985, KOBUNSHI KANKO KAI; "Applications and Market of UV•EB Curing Techniques", ed. RadTech Research Organization, p. 79, 1989, Published by CMC Publishing Company; TAKIYAMA Eiichiro, "Handbook of Polyester Resins", 1988, Published by The Nikkan Kogyo Shinbun Ltd., or radical-polymerizable monomers, oligomers and polymers known in this art.

Also known in this art as the radical-polymerizable compound include, for instance, photocurable and polymerizable compounds used in the photo-polymerizable compositions such as those disclosed in, for instance, Japanese Un-Examined Patent Publication Nos. Hei 7-159983, Hei 8-224984, Hei 10-863 and Hei 9-134011; and Japanese Examined Patent Publication Hei 7-31399 and these compounds can likewise be used in the ink composition of the present invention.

In addition, usable herein as such radical-polymerizable compounds also include (meth)acrylic acid esters (hereunder also referred to as "acrylate compounds, discretionally") such as (meth)acrylic monomers or prepolymers, epoxy type monomers or prepolymers, and urethane type monomers or prepolymers. Preferred are those listed below:

More specifically, there may be listed, for instance, 2-ethylhexyl-diglycol acrylate, 2-hydroxy-3-phenoxy-propyl acrylate, 2-hydroxybutyl acrylate, hydroxy pivalic acid neo-pentyl glycol diacrylate, 2-acryloyloxyethyl phthalate, methoxy-polyethylene glycol acrylate, tetramethylol-methane triacrylate, 2-acryloyloxy-ethyl-2-hydroxyethyl phthalate, di-methylol-tricyclodecane diacrylate, ethoxy-modified phenyl acrylate, 2-acryloyloxy-ethyl succinate, nonylphenol-EO adduct acrylate, modified glycerin triacrylate, bisphenol A diglycidyl ether acrylic acid adduct, modified bisphenol A diacrylate, phenoxy-polyethylene glycol acrylate, 2-acryloyloxy-ethyl hexahydro-phthalate, bisphenol A-PO adduct diacrylate, bisphenol A-EO adduct diacrylate, di-pentaerythritol hexa-acrylate, pentaerythritol triacrylate tolylene-diisocyanate urethane prepolymer, lactone-modified flexible acrylate, butoxyethyl acrylate, propylene glycol diglycidyl ether-acrylic acid adduct, pentaerythritol triacrylate hexa-methylene diisocyanate urethane prepolymer, 2-hydroxyethyl acrylate, methoxy di-propylene glycol acrylate, di-trimethylol-propane tetraacrylate, pentaerythritol triacrylate hexamethylene diisocyanate urethane prepolymer, stearyl acrylate, isoamyl acrylate, isomyristyl acrylate, iso-stearyl acrylate, and lactone-modified acrylate.

These acrylate compounds may rather reduce the viscosity of the ink composition as compared with the polymerizable compounds used in the conventional UV-curable ink and accordingly, the use thereof would provide an ink composition showing stable ink-discharge properties and excellent in the sensitivity to polymerization and the adhesion to a recording medium.

(B') Other Radical-Polymerizable Compounds

In addition to the aforementioned polybutadiene component (A) and (meth)acryloyl group-containing radical-polymerizable compound, the ink composition of the present invention may likewise comprise other radical-polymerizable compounds.

The radical-polymerizable compound is a compound having a radical-polymerizable and ethylenically unsaturated bond in the molecule and accordingly, the compound may be any one insofar as it has at least one radical-polymerizable and ethylenically unsaturated bond and examples thereof include those in the chemical forms such as monomers, oligomers and polymers. The radical-polymerizable compounds may be used alone or in any combination of at least two of them.

Examples of such compounds each having a radical-polymerizable and ethylenically unsaturated bond in the molecule are radical-polymerizable compounds, for instance, unsaturated carboxylic acids and salts such as itaconic acid, crotonic acid, isocrotonic acid and maleic acid; ethylenically unsaturated group-containing anhydrides; acrylonitrile, styrene; and a variety of unsaturated polyesters, unsaturated polyethers, unsaturated polyamides and unsaturated urethanes.

Moreover, it is preferred to use vinyl ether compounds as the foregoing radical-polymerizable compounds. Examples of vinyl ether compounds suitably used herein include mono-, di- or tri-vinyl ethers compounds such as ethylene glycol di-vinyl ether, ethylene glycol mono-vinyl ether, diethylene glycol di-vinyl ether, tri-ethylene glycol mono-vinyl ether, tri-ethylene glycol di-vinyl ether, propylene glycol di-vinyl ether, di-propylene glycol di-vinyl ether, butane-diol di-vinyl ether, hexane-diol di-vinyl ether, cyclohexane di-methanol di-vinyl ether, hydroxyethyl mono-vinyl ether, hydroxynonyl mono-vinyl ether, trimethylol-propane tri-vinyl ether; mono-vinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexane di-methanol mono-vinyl ether, n-propyl vinyl ether, isopropyl vinyl ether, isopropenyl ether-O-propylene carbonate, dodecyl vinyl ether, diethylene glycol mono-vinyl ether, and octadecyl vinyl ether.

Among these vinyl ether compounds, preferred are di-vinyl ether compounds and tri-vinyl ether compounds from the viewpoint of the curability, the adherence to substrates and the hardness of the surface of the resulting ink film and, in particular, di-vinyl ether compounds are preferably used herein. These vinyl ether compounds may be used alone or in any combination of at least two of them.

(B") Other Polymerizable Compounds

The ink composition of the present invention may further comprise, if necessary, other polymerizable compounds in combination with the foregoing components. For instance, the ink composition may comprise cation-polymerizable compound in combination with the foregoing ones.

The cation-polymerizable compound used in the present invention is not restricted to any particular one insofar as it can initiate a polymerization reaction by the action of the acid originated from a photolytically acid-generating agent to thus cause its curing and usable herein include, for instance, various kinds of conventional cation-polymerizable monomers known as optically and cationically polymerizable monomers. Examples of such cation-polymerizable compounds are epoxy compounds, vinyl ether compounds and oxetane compounds such as those disclosed in, for instance, Japanese Un-Examined Patent Publication Nos. Hei 6-9714, 2001-31892, 2001-40068, 2001-55507, 2001-310938, 2001-310937 and 2001-220526.

In addition to the foregoing, there have also been known, for instance, polymerizable compounds used in the cation-polymerizable type photocurable resins as the cation-polymerizable compound and they have recently been opened to the public in, for instance, Japanese Un-Examined Patent Publication Nos. Hei 6-43633 and Hei 8-324137 as the polymerizable compounds used in the optically cation-polymerizable type photocurable resins, which have been sensitized against the light rays having wavelengths falling within the visible range of not less than 400 nm. These compounds may likewise be used in the ink composition of the present invention.

<Content of Polymerizable Compound>

In the present invention, the total amount of the polymerizable compounds, or the total content of the polybutadiene component (A) and the (meth)acryloyl group-carrying radical-polymerizable compound (B), preferably ranges from 45 to 95% by weight and more preferably 50 to 90% by weight on the basis of the total mass of the ink composition of the present invention.

In the ink composition of the present invention, the mixing ratio of the polybutadiene component (A) to the (meth)acryloyl group-carrying radical-polymerizable compound (B), i.e., (A):(B) preferably ranges from 2:98 to 20:80 and more preferably 3:97 to 15:85.

Incidentally, when selecting the polymerization initiator and the polymerizable compound, in the present invention, the following combinations are, for instance, used as a means for preventing any reduction of the light-sensitivity of the ink composition due to the light-shielding or light-screening effect of the colorant used in the composition: the combination of a cation-polymerizable compound with a cationic polymerization initiator; and the combination of a radical-polymerizable compound with a radical-polymerization initiator, and it is also possible to use these polymerizable compounds and polymerization initiators in combination to thus give a radical-cation hybrid type curable ink composition.

[(C) Radical-Polymerization Initiator]

The ink composition of the present invention comprises a radical-polymerization initiator. Usable herein as such radical-polymerization initiators are conventionally known ones. In the present invention, it is preferred to use radical-polymerization initiators.

The polymerization initiator used in the ink composition of the present invention is a compound which can generate polymerization-initiating species through the absorption of external energy. The forms of external energy used for the initiation of a polymerization reaction are roughly divided into heat and radiations and examples thereof are heat polymerization initiators and photopolymerization initiators, respectively. Examples of radiations are α-beams, γ-beams, β-beams, electron beams, ultraviolet light rays, visible light rays and infrared light rays.

The heat polymerization initiators and photopolymerization initiators usable herein may be those conventionally known in the art.

Examples of radical-polymerization initiators preferably used in the present invention are (a) aromatic ketones; (b) acyl-phosphine oxide compounds; (c) aromatic onium compounds; (d) organic peroxides; (e) thio compounds; (f) hexaaryl biimidazole compounds; (g) ketoxime ester compounds; (h) borate compounds; (i) azinium compounds; (j) metallocene compounds; (k) active ester compounds; (l) carbon-halogen bond-containing compounds; and (m) alkylamine compounds.

These radical-polymerization initiators may be used alone or in any combination, in the present invention.

[(C') Cation-Polymerization Initiators]

When using a cation-polymerizable compound simultaneous with the foregoing components in the invention, it is preferred to use cation-polymerization initiator in combination therewith.

Examples of cation-polymerization initiators (photolytically acid-generating agents) preferably used in the present invention include chemically sensitized photoresists, and compounds used in the optical cation-polymerization (see, "Organic Materials for Imaging", edited by Research Association of Organic Electronics Materials, 1993, pp. 187-192, published by BUNSHIN Publishing Company). The following are specific examples of cation-polymerization initiators suitably used in the present invention:

First of all, there can be listed, for instance, $B(C_6F_5)_4^-$, $PF_6^-$, $AsF_6^-$, $SbF_6^-$, and $CF_3SO_3^{31}$ salts of aromatic onium compounds such as diazonium, ammonium, iodonium, and phosphonium compounds. Secondly, there can be listed, for instance, sulfonated compounds capable of generating sulfonic acid. Thirdly, usable herein also include halogenated compounds which can photolytically generate hydrogen halides. Fourthly, there can likewise be listed, for instance, iron-allene complexes.

The foregoing cation-polymerization initiators may be used alone or in any combination comprising at least two of them.

In the present invention, it is suitable that the polymerization initiator component (C) is incorporated into the ink composition according to the present invention in an amount preferably ranging from 0.01 to 35% by weight, more preferably 0.1 to 30% by weight and further preferably 0.5 to 30% by weight, on the basis of the total mass of the foregoing components (A) and (B) or the total mass of the foregoing components (A) and (B) and other polymerizable compounds as the optional components.

Moreover, it is suitable that the mixing ratio (by weight) of the polymerization initiator component (C) to the sensitizing dye (E) used according to need as will be detailed below ranges from 200:1 to 1:200, preferably 50:1 to 1:50, and more preferably 20:1 to 1:5.

[(D) Colorant]

Although it is not always necessary to form colored images when applying the ink composition of the invention to the formation of the image areas of a lithographic printing plate, the ink composition may comprise (D) a colorant when it is intended to improve the visibility of the image area, or to form colored images using an ink composition.

The colorants usable herein are not restricted to particular ones, but preferably used herein include pigments (D-1) and oil-soluble dyes, which are excellent in the weatherability and are rich in the ability of reproducing a color, and these colorants may arbitrarily be selected from known colorants such as soluble dyes and used in the ink composition. The colorants suitably used in the ink composition of the present invention or the ink composition for use in the ink-jet recording system are preferably selected from compounds which never serve as polymerization-inhibitory agents in the polymerization reaction of the ink composition or the curing reaction thereof, in view of the prevention of any reduction of the sensitivity of the composition to activated radiant rays for the initiation of the curing reaction thereof.

(D-1) Pigments

The pigments usable in the present invention are not restricted to specific ones, but specific examples thereof include organic and inorganic pigments disclosed in Color Index and specified by the following numerals, which can arbitrarily be selected depending on any desired purposes:

Red or magenta pigments such as Pigment Red Nos. 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257; Pigment Violet Nos. 3, 19, 23, 29, 30, 37, 50, 88; Pigment Orange Nos. 13, 16, 20, 36; blue or cyan pigments such as Pigment Blue Nos. 1, 15, 15:1, 15:2, 15:3, 15:4, 15:6, 16, 17:1, 22, 27, 28, 29, 36, and 60;

Green pigments such as Pigment Green Nos. 7, 26, 36, 50;

Yellow pigments such as Pigment Yellow Nos. 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193;

Black pigments such as Pigment Black Nos. 7, 28, 26;

White pigments such as Pigment White Nos. 6, 18 and 21.

(D-2) Oil-Soluble Dyes

Now the oil-soluble dyes usable in the present invention will be described in detail below.

The oil-soluble dye usable in the present invention herein means a dye substantially insoluble in water. More specifically, the oil-soluble dye herein used means one whose solubility in water as determined at 25° C. (the mass of each dye capable of being dissolved in 100 g of water) is not more than 1 g, preferably not more than 0.5 g and more preferably not more than 0.1 g. For this reason, the term "oil-soluble dye" includes so-called water-insoluble pigments or oil-soluble dyes and preferred are oil-soluble dyes among others.

Among the foregoing oil-soluble dyes usable in the present invention, the yellow dye may be any one and specific examples thereof include aryl or heteroaryl azo dyes having, as their coupling components, phenols, naphthols, anilines, pyrazolones, pyridones or chain-opened active methylene compounds; azomethine dyes having, as the coupling components, chain-opened active methylene compounds; methine dyes such as benzylidene dyes and mono-methine oxonol dyes; and quinone type dyes such as naphthoquinone dyes and anthraquinone dyes; and examples of other dye species include quinophthalone dyes, nitro•nitroso dyes, acridine dyes and acridinone dyes.

Among the foregoing oil-soluble dyes usable in the present invention, the magenta dyes may be any conventionally known one. Examples thereof include aryl or heteroaryl azo dyes having, as their coupling components, phenols, naphthols, anilines; azomethine dyes having, as the coupling components, pyrazolones, pyrazolo-triazoles; methine dyes such as arylidene dyes, styryl dyes, merocyanine dyes, and oxonol dyes; carbonium dyes such as diphenyl-methane dyes, triphenyl-methane dyes and xanthene dyes; quinone type dyes such as naphthoquinone dyes, anthraquinone dyes and anthrax-pyridones dyes; and condensed polycyclic dyes such as dioxazine dyes.

Among the foregoing oil-soluble dyes usable in the present invention, the cyan dyes may be any conventionally known one. Examples thereof include indo-aniline dyes, indo-phenol dyes, or azomethine dyes having, as the coupling components, pyrrolo-triazoles; polymethine dyes such as cyanine dyes, oxonol dyes and merocyanine dyes; carbonium dyes such as diphenyl-methane dyes, triphenyl-methane dyes and xanthene dyes; phthalocyanine dyes; anthraquinone dyes; aryl or heteroaryl azo dyes having, as their coupling components, phenols, naphthols, anilines; and indigo.thioindigo dyes.

The foregoing respective dyes may be ones which do not show respective yellow, magenta or cyan colors until the chromophores thereof (color-developing atomic groups) are partially dissociated and in this case, the counteractions thereof may be, for instance, inorganic cations such as alkali metal ions and ammonium ions, or organic cations such as pyridinium and quaternary ammonium salts, or further polymer cations carrying these inorganic or organic cations on the partial structure thereof.

Specific examples of such colorants preferably used herein include, but are not limited to, C.I. Solvent Black Nos. 3, 7, 27, 29 and 34; C.I. Solvent Yellow Nos. 14, 16, 19, 29, 30, 56, 82, 93 and 162; C.I. Solvent Red Nos. 1, 3, 8, 18, 24, 27, 43, 49, 51, 72, 73, 109, 122, 132 and 218; C.I. Solvent Violet No. 3; C.I. Solvent Blue Nos. 2, 11, 25, 35, 38, 67 and 70; C.I. Solvent Green Nos. 3 and 7; and C.I. Solvent Orange No. 2.

Among these, particularly preferred are Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (available from Orient Chemical Co., Ltd.); Aizen Spilon Blue GNH (available from Hodogaya Chemical Co., Ltd.); Neopen Yellow 075, Neopen Magenta SE1378, Neopen Blue 808, Neopen Blue FF4012, Neopen Cyan FF4238 (available from BASF Company).

In the present invention, the oil-soluble dyes may be used alone or in the form of a mixture comprising several kinds thereof.

In addition, when using an oil-soluble dye as the colorant, the ink composition of the present invention can also comprise, if necessary, colorants such as other water-soluble dyes, disperse dyes, and/or pigments in an amount which never adversely affects the intended effects of the present invention.

In the present invention, it is also possible to use a disperse dye to such an extent that it can solubilized in a water-immiscible organic solvent. In general, the disperse dye also includes water-soluble dyes as well, but it is preferably used in an amount capable of being solubilized in a water-immiscible organic solvent, insofar as the ink composition of the present invention is concerned. Specific examples of disperse dyes preferably used herein are C.I. Disperse Yellow Nos. 5, 42, 54, 64, 79, 82, 83, 93, 99, 100, 119, 122, 124, 126, 160, 184:1, 186, 198, 199, 201, 204, 224 and 237; C.I. Disperse Orange Nos. 13, 29, 31:1, 33, 49, 54, 55, 66, 73, 118, 119 and 163; C.I. Disperse Red Nos. 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet No. 33; C.I. Disperse Blue Nos. 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green Nos. 6:1 and 9.

The colorants usable in the present invention are preferably ones capable of being dispersed in the ink composition of the present invention to a satisfactory extent after the incorporation thereof into the composition. The colorant may be dispersed in the ink composition using, for instance, a variety of dispersing devices such as a ball mill, a sand mill, an attritor, a roll mill, an agitator, a Henschel mixer, a colloid mill, an ultrasonic homogenizer, a pearl mill, a wet-jet mill and a paint shaker.

Moreover, a dispersant may be added to the composition when dispersing the colorant therein. Such a dispersant is not restricted to any specific one and preferably used herein are polymeric dispersants. For instance, specific examples thereof include Solsperse Series commercially available from Noveon Company. A synergist corresponding to each particular pigment can likewise be used as such a dispersant. In the present invention, these dispersants and dispersing agents are used in an amount ranging from 1 to 50 parts by weight per 100 parts by weight of the colorant used.

When preparing the ink composition of the present invention, the colorant may directly be added together with other respective components, but it is also possible to previously added to a solvent or a dispersion medium such as a specific polymerizable compound (A) or other polymerizable compounds used in the present invention so that the colorant is uniformly dispersed or dissolved for the purpose of improving the dispersibility thereof and then incorporated into the composition.

In the present invention, the colorant is preferably added to any one of the polymerizable compound or a mixture thereof in advance before the incorporation of the same into the composition in order to eliminate the occurrence of a problem of the deterioration of the solvent resistance encountered when the solvent remains in the cured images and a problem concerning the VOC (Volatile Organic Compound) originated from the residual solvent. In this respect, it is preferred that a monomer having the lowest viscosity value be selected as the polymerizable compound used for the addition of the colorant when taking into consideration only the dispersion aptitude.

It would be sufficient that one or at least two colorants are selected depending on each particular purpose prior to the practical use.

In this connection, when using a colorant such as a pigment which is present in the ink composition of the present invention still in its solid state, it is preferred to appropriately select the colorant, the dispersant and the dispersion medium to be used and to appropriately establish the conditions for dispersing the same and for the filtration thereof in such a manner that the average particle size thereof preferably falls within the range of from 0.005 to 1.5 µm, more preferably 0.01 to 1.2

μm and further preferably 0.015 to 1.0 μm. Such particle size control is quite advantageous since it would permit the prevention of any clogging of the head's nozzles of the ink-jet recording device and the maintenance of the storage stability, transparency and sensitivity to curing of the resulting ink composition.

The content of the colorant in the ink composition of the present invention is appropriately selected depending on each particular application thereof, but it in general ranges from preferably 1 to 10% by weight and more preferably 2 to 8% by weight on the basis of the total mass of the ink composition while taking into consideration the physical properties of the resulting ink and the colorability of the colorant.

In addition to the foregoing essential components, the ink composition of the present invention may further comprise other components in combination for the purpose of, for instance, the improvement of the physical properties of the resulting ink composition, insofar as they never adversely affect the intended effects of the present invention.

These optional or arbitrary components will be described below in detail.

[(E) Sensitizing Dye]

The ink composition of the present invention may comprise (E) a sensitizing dye for promoting the decomposition of the polymerization initiator (C) through the irradiation with activated radiant rays. The sensitizing dye is converted into an electrically excited state through the absorption of activated radiant rays having a specific wavelength. The sensitizing dye in its excited state comes in close contact with a polymerization initiator to induce the electron transfer, energy transfer and/or heat generation of the initiator and to thus cause some chemical changes in the initiator or to promote, for instance, the decomposition, radical-generation, acid- or base-generation of the same.

It is sufficient to use, as the sensitizing dye, a compound selected depending on the wavelength of the activated radiant rays used for the irradiation of the polymerization initiator (C) to thus generate polymerization-initiating species, but preferred examples of such sensitizing dyes are those belonging to the following groups of compounds and capable of absorbing light rays having a wavelength ranging from 350 to 450 nm, while taking notice of the fact that they are used in the general curing reactions of ink compositions:

More specifically, there may be listed, for instance, polynuclear aromatic compounds (such as anthracene, pyrene, perylene, and triphenylene), thioxanthones (such as isopropyl thioxanthone), xanthenes (such as fluoresceine, Eosine, Erythrosine, Rhodamine B, Rose Bengal), cyanines (such as thiacarbocyanine, oxacarbocyanine), merocyanines (such as merocyanine, carbo-merocyanine), thiazines (such as Thionine, Methylene Blue, Toluidine Blue), acridines (such as Acridine Orange, Chloroflavin, acriflavin), anthraquinones (such as anthraquinone), squaliums (such as squalium), coumarins (such as 7-diethylamino-4-methyl coumarin), with polynuclear aromatic compounds and thioxanthones being preferably used in the present invention, among others.

[(F) Co-Sensitizing Agents]

The ink composition of the present invention may further comprise a co-sensitizing agent. In the present invention, the co-sensitizing agent shows such effects of, for instance, the further improvement of the sensitivity of the sensitizing dye against the activated radiant rays and the control of any polymerization-inhibitory effect of oxygen gas on the polymerizable compound.

Examples of such co-sensitizing agents are amines such as compounds as disclosed in, for instance, M. R. Sander et al., Journal of Polymer Society, 1972, 10:3173; Japanese Examined Patent Publication Sho 44-20189; Japanese Un-Examined Patent Publication Nos. Sho 51-82102, Sho 52-134692, Sho 59-138205, Sho 60-84305, Sho 62-18537 and Sho 64-33104; and Research Disclosure No. 33825 and more specifically, examples thereof include triethanol-amine, p-dimethylamino-benzoic acid ethyl ester, p-formyl dimethyl-aniline, and p-methyl thio-dimethylaniline.

Examples of other co-sensitizing agents are thiols and sulfides such as disulfide compounds disclosed in Japanese Un-Examined Patent Publication (hereunder referred to as "J.P. KOKAI") Nos. Sho 53-702, Sho 56-75643 and Hei 5-142772 and Japanese Examined Patent Publication (hereunder referred to as "J.P. KOKOKU") Sho 55-500806, and specific examples thereof include 2-mercapto-benzothiazole, 2-mercapto-benzoxazole, 2-mercapto-benzimidazole, 2-mercapto-4(3H)-quinazoline, and β-mercapto-naphthalene.

Examples of still further co-sensitizing agents are amino acid compounds (such as N-phenyl glycine); organometal compounds disclosed in J.P. KOKOKU Sho 48-42965 (such as tributyl tin acetate); hydrogen atom-donors disclosed in J.P. KOKOKU Sho 55-34414; sulfur atom-containing compounds disclosed in J.P. KOKAI Hei 6-308727 (such as trithiane); phosphorus atom-containing compounds disclosed in J.P. KOKAI Hei 6-250387 (such as diethyl phosphite); and Si—H and Ge—H compounds such as those disclosed in J.P. KOKAI Hei 8-65779.

[(G) Other Components]

Other components may, if necessary, be incorporated into the ink composition of the present invention. Examples of such other components include polymerization inhibitors and solvents.

The polymerization inhibitor can be added to the ink composition from the viewpoint of the improvement of the storability. In addition, if using the ink composition of the present invention as an ink-jet recording-ink composition, the composition is preferably heated to a temperature ranging from 40 to 80° C. to reduce the viscosity prior to the discharge thereof through the nozzles and accordingly, the ink composition preferably comprises a polymerization inhibitor in order to prevent any clogging of the head of the recording device due to the heat polymerization of the composition. The polymerization inhibitor is preferably added to the ink composition of the present invention in an amount ranging from 200 to 20,000 ppm with respect to the total mass of the composition. Examples of such polymerization inhibitors include hydroquinone, benzoquinone, p-methoxy phenol, TEMPO, TEMPOL and CUPFERRON Al.

The ink composition of the present invention is preferably free of any solvent so that it can rapidly undergo the desired reaction to thus cause the cure thereof immediately after the impact of the composition on a recording medium, while taking into consideration the fact that the ink composition is a radiation-curable ink composition. Moreover, it is likewise preferred that the ink composition is free of any solvent for the solution of the problem of VOC. However, any desired solvent can be incorporated into the ink composition insofar as it never adversely affects, for instance, the curing rate of the ink composition. Examples of such solvents usable in the present invention are organic solvents and water. In particular, an organic solvent may be added to the composition for the improvement of the adhesion thereof to a recording medium (for instance, substrate such as paper).

The amount of the organic solvent to be incorporated into the ink composition ranges from, for instance, 0.1 to 5% by weight and preferably 0.1 to 3% by weight on the basis of the total mass of the composition.

Further, any known compound can, if necessary, be added to the ink composition of the present invention. Examples of such additional compounds are surfactants, additives for leveling, matting agents, polyester type resins for controlling physical properties of the resulting film, polyurethane type resins, vinylic resins, acrylic resins, rubber type resins, and waxes, which may properly be selected depending on each particular purpose. It is also preferred to add a tackifier, which never inhibits the polymerization of the ink composition, for the purpose of the improvement of the adhesion thereof to the recording medium made of, for instance, polyolefin or PET. Specific examples thereof include high molecular weight adhesive polymers disclosed in J.P. KOKAI 2001-49200, pp. 5 to 6 (such as copolymers comprising esters of (meth)acrylic acid with alcohols each carrying an alkyl group having 1 to 20 carbon atoms, esters of (meth)acrylic acid with alicyclic alcohols each having 3 to 14 carbon atoms, and esters of (meth) acrylic acid with aromatic alcohols each having 6 to 14 carbon atoms); and low molecular weight adhesiveness-imparting resins each having polymerizable unsaturated bonds.

[Characteristic Properties of Ink Composition]

The ink composition of the present invention can suitably be used as an ink-jet recording-ink composition. The following is the description concerning preferred physical properties desirable for the ink composition of the present invention, when it is used in such embodiments of applications.

When using the ink composition of the present invention as an ink-jet recording-ink composition, the composition should have a viscosity value as determined at the temperature for discharging the ink composition (for instance, 25 to 60° C., preferably 35 to 50° C.) preferably ranging from 7 to 30 mPa·s and more preferably 7 to 25 mPa·s, while taking into consideration the ability to discharge the ink composition through nozzles.

In the ink composition of the present invention, it is preferred to appropriately control the compositional ratio thereof in such a manner that the viscosity of the resulting composition falls within the range specified above. The viscosity thereof as determined at room temperature should be set at a high level and this accordingly permits the inhibition of any penetration of the ink into a recording medium even when a porous recording medium is used, the reduction of the amount of the uncured monomer and the reduction of the generation of offensive odors. In addition, this also inhibits the occurrence of any blurring of the ink upon the impact of ink droplets on a recording medium and as a result, this consequently improves the quality of images thus formed.

The surface tension of the ink composition of the present invention preferably ranges from 20 to 30 mN/m, and more preferably 23 to 28 mN/m. When recording images on a variety of recording mediums such as those made of polyolefins, PET, coated paper, uncoated paper, the surface tension of the ink composition is preferably not less than 20 mN/m from the viewpoint of the blurring and penetration of the ink, and preferably not more than 30 mN/m, while taking into consideration the ability thereof to wet the recording medium.

<Ink-Jet Recording Method>

The following are the detailed description concerning the ink-jet recording method according to the present invention and the ink-jet recording device which can be used in the ink-jet recording method.

The ink-jet recording method according to the present invention comprises the steps of discharging the ink composition of the present invention onto a recording medium for ink-jet recording (such as a support or a substrate, a recording material, or the like) and then irradiating the ink composition discharged onto the recording medium with activated radiant rays to cure the ink and to thus form desired images.

More specifically, the ink-jet recording method according to the present invention is characterized in that it comprises the steps of (i-1) discharging the ink composition of the present invention onto a recording medium and (i-2) irradiating the ink composition discharged onto the recording medium with activated radiant rays to thus cure the ink composition.

The ink-jet recording method according to the present invention permits the formation of images of a cured ink composition on a recording medium since the method comprises the foregoing steps (i-1) and (i-2).

Ink-jet recording devices, as will be detailed below, can be used in the foregoing step (i-1) included in the ink-jet recording method according to the present invention.

[Ink-Jet Recording Devices]

The ink-jet recording device used in the ink-jet recording method according to the present invention is not restricted to any specific one and it may arbitrarily be selected from the conventionally known ones which can ensure an intended resolution and used in the method. More specifically, any one of the known ink-jet recording devices including commercially available ones can be used for the discharge of an ink composition onto a recording medium in the foregoing step (i-1) of the ink-jet recording method of the present invention.

Examples of the ink-jet recording devices usable in the present invention are those each comprising an ink-supply system, a temperature sensor and a source of activated radiant rays.

The ink-supply system comprises, for instance, a main tank containing the ink composition of the present invention, a piping system for supply, an ink supply tank positioned immediately before an ink-jet head, a filter, and a piezoelectrically operating ink-jet head. The piezoelectrically operating type ink-jet recording head can be operated in such a manner that multiple-sized dots of 1 to 100 pl, preferably 8 to 30 pl can be discharged at a resolution of, 320×320 to 4000× 4000 dpi, preferably 400×400 to 1600×1600 dpi and more preferably 720×720 dpi. In this connection, the term "dpi" herein used means the number of dots per unit length on the order of 2.54 cm.

As has been described above, in case of the radiation-curable ink like the ink composition of the present invention, the temperature of the ink discharged from the nozzles of the ink-jet recording device is preferably maintained at a predetermined constant level, and therefore, the ink-jet recording device may be provided with a means for thermally insulating or heating the region extending from the ink-supply tank to the ink-jet head portion. The method for such temperature control is not particularly restricted, but a plurality of temperature sensors are, for instance, arranged on every piping sections and the foregoing region is preferably heated to thus control the temperature thereof, while monitoring the flow rate of the ink, the environmental temperature or the like. Temperature sensors may be arranged on the ink-supply tank and in the proximity to the nozzles of the ink-jet recording head. Moreover, the head unit to be heated is preferably thermally shielded or insulated so that the body of the ink-jet recording device is not affected by the temperature of the external atmosphere. To shorten the rise time of a printer required for the pre-heating of the same or to minimize the loss of heat energy, it would be quite preferred that the printer is isolated from other sections of the device and the overall heat capacity of the heating unit is minimized at the same time.

The discharge of the ink composition of the present invention using the foregoing ink-jet recording device is preferably carried out after heating the ink composition to a temperature preferably ranging from 40 to 80° C. and more preferably 25 to 50° C. to thus reduce the viscosity of the ink composition to the level preferably ranging from 7 to 30 mPa·s and more preferably 7 to 25 mPa·s.

The radiation-curable ink like the ink composition of the present invention in general has a viscosity value higher than that observed for the usual aqueous ink currently employed as the ink-jet recording-ink and accordingly, the viscosity thereof is greatly affected by the variation in the temperature thereof upon its discharge. The size of droplets formed and the discharge rate of the droplets are quite susceptible to the fluctuation in the viscosity of the ink and the variations thereof are thus greatly affected by the same and this in turn results in the deterioration of the quality of images. For this reason, the temperature of the ink upon its discharge should be maintained at a constant level as careful as possible. Accordingly, in the present invention, the latitude in the control of the ink temperature suitably falls within the following range: the set temperature±5° C., preferably the set temperature±2° C., and more preferably the set temperature±1° C.

Then the step (i-2) or the irradiation of the ink composition discharged onto the recording medium with activated radiant rays to thus cure the ink composition will hereunder be described in more detail.

The ink composition discharged onto the recording medium is cured through the irradiation thereof with activated radiant rays. This is because the polymerization initiator (C) included in the ink composition of the present invention is decomposed by the action of the activated radiant rays, and as a result, the initiator generates polymerization-initiating species such as radicals, acids and/or bases, and these polymerization-initiating species then induce or promote the polymerization reaction of a specific polymerizable compound or optional another polymerizable compound used in combination therewith. At this stage, if a sensitizing dye (E) is present in the ink composition simultaneous with the polymerization initiator (C), the sensitizing dye (E) in this ink system is converted into one in an excited state through the absorption of the activated radiant rays, the excited sensitizing dye molecules come in close contact with the polymerization initiator (C) and thus accelerate the decomposition of the polymerization initiator (C) to thus induce the curing reaction in a higher sensitivity.

Examples of such activated radiant rays which can be used herein include α-beams, γ-beams, β-beams, electron beams, X-rays, ultraviolet light rays, visible light rays and infrared light rays. In particular, preferably used herein are electron beams, ultraviolet light rays and visible light rays. For instance, the peak wavelength of the activated radiant rays may preferably range from 200 to 600 nm, more preferably 300 to 450 nm and further preferably 350 to 420 nm, although it may vary depending on the absorption characteristics of the sensitizing dye selected.

In addition, the polymerization initiator system of the ink composition according to the present invention shows sufficiently high sensitivity even to the activated radiant rays of low outputs. Therefore, the output of the activated radiant rays is preferably not more than 2,000 mJ/cm$^2$, more preferably 10 to 2,000 mJ/cm$^2$, further preferably 20 to 1,000 mJ/cm$^2$, and particularly preferably 50 to 800 mJ/cm$^2$.

The ink composition discharged onto a recording medium should be irradiated with activated radiant rays at an illuminance as determined on the exposed area suitably ranging from, for instance, 10 to 2,000 mW/cm$^2$ and preferably 20 to 1,000 mW/cm$^2$.

Mercury lamps, gas·solid lasers or the like have mainly been used as the sources of activated radiant rays and mercury lamps and metal halide lamps have widely been known as light sources for the cure of the ultraviolet light-curable ink-jet recording-ink. However, there have strongly been desired, recently, for the use of mercury-free light sources from the viewpoint of the prevention of any environmental pollution and it would be quite effective to substitute GaN type semiconductor ultraviolet light-emitting devices for the foregoing light sources from the industrial and environmental standpoints. Moreover, LED (UV-LED) and LD (UV-LD) have small sizes and a substantially long service life and permit the achievement of high efficiency, and the use thereof is not expensive. For this reason, they have been expected as the light sources for use in the light-curing ink-jet recording technique.

In addition, light-emitting diodes (LED) and laser diodes (LD) can likewise be used as sources for the activated radiant rays used herein. In particular, when the use of an ultraviolet light source is required, ultraviolet LEDs and ultraviolet LDs can be used. For instance, ultraviolet LEDs whose principal emitting spectrum resides in the region between 365 nm and 420 nm have been put on the market by Nichia Chemical Co., Ltd. When the use of a light source which can emit light rays of a further shorter wavelength is required, it is possible to use an LED capable of emitting activated radiant rays having a peak wavelength falling within the range of from 300 nm to 370 nm such as those disclosed in U.S. Pat. No. 6,084,250. Further, other ultraviolet LEDs are likewise available, which can emit light rays of wavelengths falling within different ultraviolet regions. As the light sources for the activated radiant rays, particularly preferably used in the present invention are, for instance, UV-LEDs and in particular, those having peak wavelengths falling within the range of from 350 to 420 nm.

In this connection, the maximum illuminance of the LED on the surface of a recording medium preferably ranges from 10 to 2,000 mW/cm$^2$, more preferably 20 to 1,000 mW/cm$^2$ and particularly preferably 50 to 800 mW/cm$^2$.

The ink composition of the present invention is suitably irradiated with such activated radiant rays for a time, for instance, ranging from 0.01 to 120 seconds and preferably 0.1 to 90 seconds.

The conditions for the irradiation with the activated radiant rays and the fundamental irradiation method are disclosed in J.P. KOKAI Sho 60-132767. More specifically, the images of the discharged ink composition is irradiated with the activated radiant rays according to the so-called shuttle system in which light sources are arranged on the both sides of a head unit provided with an ink-discharging device and the surface of the recording medium is scanned with the head unit and the light sources. The irradiation with the activated radiant rays is in general carried out after the elapse of a predetermined time from the impact of the ink (for instance, 0.01 to 0.5 second, preferably 0.01 to 0.3 second and more preferably 0.01 to 0.15 second). Any blurring of the ink discharged and deposited on a recording medium prior to its cure can certainly be prevented by substantially reducing the time elapsed from the impact of the ink till the irradiation thereof as has been described above. In addition, the ink deposited on even a porous recording medium can be exposed to light rays prior to the penetration thereof even to such a deep region that any exposed light never reaches. Therefore, any unreacted monomer never remains and as a result, the emission of a bad smell can substantially be reduced.

Further, the cure of the discharged ink can likewise be completed by the use of a separate light source free of any driving mechanism. The pamphlet of WO 99/54415 discloses such irradiation methods as one which makes use of an optical fiber and one in which the collimated light emitted from a light source is incident upon a mirror surface arranged on a side of a head unit to thus irradiate a recording area with the UV light rays and these curing methods can likewise be applied to the ink-jet recording method according to the present invention.

The use of the foregoing ink-jet recording method would permit the impact of a variety of recording mediums having different surface wettability with dots of an ink composition having a uniform diameter and this accordingly results in the improvement of the image quality. In this respect. It is preferred that colors are superimposed in the order of the lightness thereof, for the purpose of obtaining colored images. If ink compositions having different colors are superimposed in the order of their lightness, the light rays used for the irradiation thereof can easily arrive even at the ink present in the deeper region, and it would thus be expected that this ensures good sensitivity to curing, results in the reduction of the residual amount of the unreacted monomer and correspondingly the quantity of bad smells given out of the finally formed images and leads to the improvement of the adhesion to the recording medium. The irradiation with the activated radiant rays may collectively be carried out after all of the colors are discharged, but it is preferred that the light exposure is carried out for each color, from the viewpoint of the acceleration of its cure.

Thus, the ink composition of the present invention permits the formation of images on the surface of a recording medium by the irradiation thereof with activated radiant rays to thus highly sensitively cure the images.

[Recording Mediums]

The ink-jet recording method of the present invention permits the printing of a variety of recording mediums. Examples of such recording mediums usable herein are those prepared from a variety of materials, for instance, polyolefins such as polypropylene and polystyrene; polyesters such as PET and PEN; polycarbonate, polyvinyl chloride, polyacrylic resins, glass, metals, coated paper, and un-coated paper.

<Lithographic Printing Plate and Method for Preparing the Same>

A lithographic printing plate can be prepared according to the ink-jet recording method of the present invention or it may be prepared by applying the ink composition of the present invention onto the surface of a hydrophilic substrate (or support) and then curing the ink composition applied to the substrate.

Now, the method for the preparation of a lithographic printing plate (the lithographic printing plate-production method of the present invention), which makes use of the ink-jet recording method of the present invention and the lithographic printing plate prepared by the method will hereunder be described in more detail.

The lithographic printing plate of the present invention comprises a hydrophilic substrate and hydrophobic images formed on the hydrophilic substrate. The method for the production of this lithographic printing plate is characterized in that it comprises the following steps:

(ii-1) A step for discharging the ink composition of the present invention onto the surface of a hydrophilic substrate; and (ii-2) A step for curing the discharged ink composition through the irradiation thereof with activated radiant rays to thus form hydrophobic images constituted by the cured ink composition on the hydrophilic substrate.

In other words, the lithographic printing plate can be prepared by repeating the same procedures used in the ink-jet recording method of the present invention except for using a substrate whose surface is hydrophilic and which is suitable for use in the production of lithographic printing plates.

The lithographic printing plate has conventionally been prepared by imagewise exposing a so-called PS plate which has such a structure that a lipophilic light-sensitive resin layer on a hydrophilic substrate as has been described above; solubilizing or curing the exposed area on the light-sensitive resin layer to thus form image areas, while removing the non-image areas through dissolution thereof.

On the other hand, the lithographic printing plate of the present invention can be prepared using the method for the production of a lithographic printing plate according to the present invention (the ink-jet recording method of the present invention) and more specifically, the lithographic printing plate can be prepared by the method comprising the steps of directly discharging an ink composition onto the surface of a hydrophilic substrate on the basis of the digitized image information; and then curing the imagewise discharged ink composition to thus form hydrophobic image areas. Thus, the lithographic printing plate can easily be prepared as compared with the conventional techniques.

[Hydrophilic Substrate used in Lithographic Printing Plate]

The lithographic printing plate of the invention comprises a hydrophilic substrate and hydrophobic images formed on the hydrophilic substrate using the ink composition according to the present invention.

The substrate (or recording medium) for preparing a lithographic printing plate, on which the ink composition of the present invention is discharged and deposited, is not restricted to specific one and may be any dimensionally stable plate-like substrate, but preferred are substrates whose surface is hydrophilic while taking into consideration the image quality of the resulting printed matters.

The materials to be used as substrates may be used without any further pre-treatment when they show hydrophilicity, while if they do not have any hydrophilicity, the surface thereof can be treated so as to convert the same into hydrophilic ones prior to the practical use.

Examples of materials used for preparing such substrates include paper; paper laminated with a plastic film (such as polyethylene, polypropylene or polystyrene film); metal plates (such as aluminum, zinc and copper plates); plastic films (such as cellulose diacetate, cellulose triacetate, cellulose propionate, cellulose butyrate, cellulose acetate butyrate, cellulose nitrate, polyethylene terephthalate, polyethylene, polypropylene, polycarbonate and polyvinyl acetal films); and paper or plastic films which are laminated with the foils of the foregoing metals or on which the foregoing metals are deposited in the form of a thin film. Examples of substrates preferably used herein are polyester films and aluminum plates. Among them, particularly preferred are aluminum plates since they have high dimensional stability and they are relatively low in price.

The aluminum plate usable herein is a pure aluminum plate, an aluminum alloy plate mainly comprising aluminum and trace amounts of foreign elements, or a thin film of aluminum or an aluminum alloy, which is laminated with a plastic film. Examples of such foreign elements included in the aluminum alloy are silicon, iron, manganese, copper, magnesium, chromium, zinc, bismuth, nickel, and titanium. The content of these foreign elements present in the aluminum alloy is preferably not more than 10% by weight on the basis of the total mass of the alloy. In the present invention, the use of a pure aluminum plate is preferred, but those containing a trace amount of these foreign elements may be used in the invention since it would be difficult to produce a completely pure aluminum plate due to the technical limit in the refining of aluminum. The aluminum plate used herein is not limited in its composition and therefore, usable herein may appropriately be selected from those prepared from any known material.

The thickness of the substrate preferably ranges from 0.1 to 0.6 mm and more preferably 0.15 to 0.4 mm.

The aluminum plate is preferably subjected to a surface-treatment such as a surface-roughening treatment and/or an anodization treatment prior to its practical use. These surface-treatments would permit the improvement of the hydrophilicity and the establishment of good adhesion between the hydrophobic images and the substrate surface. The aluminum plate is if desired subjected to a degreasing treatment with, for instance, a surfactant, an organic solvent or an alkaline aqueous solution to thus remove the rolling oil from the surface of the plate, prior to the surface-roughening treatment thereof.

The aluminum plate may be surface-roughened according to a variety of methods and examples thereof include a mechanical surface-roughening treatment, an electrochemical surface-roughening treatment (surface-roughening treatment in which the surface of the plate is electrochemically dissolved) and a chemical surface-roughening treatment (surface-roughening treatment in which the surface of the plate is chemically and selectively dissolved).

Examples of such mechanical surface-roughening treatments include various known ones such as a ball-polishing method, a brush-polishing method, a blast-polishing method and a buff-polishing method. Alternatively, it is also possible to use a transfer method in which uneven patterns are transferred to the surface of the plate using a roll having such uneven patterns on its surface during the step for rolling the aluminum plate.

Examples of such electrochemical surface-roughening treatments include those in which the surface-roughening is carried out by passing, through the aluminum plate, an alternating or direct current in an electrolyte containing, for instance, an acid such as hydrochloric acid or nitric acid. In addition, it is also possible to use a method which makes use of a mixed acid as disclosed in J.P. KOKAI Sho 54-63902.

The aluminum plate thus surface-roughened may if necessary be subjected to an alkali etching treatment using an aqueous solution of, for instance, potassium hydroxide or sodium hydroxide, then it is subjected to a neutralization treatment and thereafter, the plate is if necessary anodized for the improvement of the wear resistance.

Electrolytes usable in the anodization treatment of the aluminum plate are, for instance, a variety of electrolytes capable of forming porous anodized layer and specific examples thereof currently used include sulfuric acid, hydrochloric acid, oxalic acid, chromic acid and mixtures thereof. The concentrations of these electrolytes are appropriately determined depending on the kinds of the electrolytes selected.

The anodization conditions may variously vary depending on the electrolyte used and cannot unconditionally be specified, but currently and preferably used are as follows: an electrolyte concentration ranging from 1 to 80% by weight; an electrolyte solution temperature ranging from 5 to 70° C.; a current density ranging from 5 to 60 A/dm$^2$; an electric voltage ranging from 1 to 100 V; and an electrolyzation time ranging from 10 seconds to 5 minutes. The quantity of the anodized layer formed preferably ranges from 1.0 to 5.0 g/m$^2$ and more preferably 1.5 to 4.0 g/m$^2$. The anodized layer formed in an amount falling within the range specified above would permits the formation of a printing plate having good printing durability and carrying non-image area having good resistance to defects.

The foregoing surface-treated and anodized substrate may be used as the substrate of the present invention without any post-treatment, but the plate may if necessary be subjected to a treatment for the further improvement of the adhesion to the hydrophobic images, the hydrophilicity and the stain resistance. Such treatment may appropriately be selected from, for instance, the following ones: a treatment for expanding the micropores present in the anodized layer, a sealing treatment of the layer such as those disclosed in J.P. KOKAI Nos. 2001-253181 and 2001-322365; and a surface-hydrophilization treatment comprising dipping the plate in an aqueous solution containing a hydrophilic compound. Of course, the micropore-expansion treatment and the sealing treatment are not restricted to any specific ones disclosed in the foregoing patents and they may likewise be any conventionally known one.

(Sealing Treatment)

Examples of such sealing treatments are a steam-sealing treatment, a sealing treatment with fluoro-zirconic acid alone, a sealing treatment with an aqueous solution containing an inorganic fluorine atom-containing compound such as sodium fluoride, a lithium chloride-containing steam-sealing treatment and a sealing treatment with hot water.

Among them, preferably used herein are sealing treatments using aqueous solutions containing inorganic fluorine atom-containing compounds, a steam-sealing treatment and a sealing treatment with hot water. These treatments will now be described in more detail below:

Sealing Treatment with Aqueous Solution of Inorganic Fluorine Atom-Containing Compound In this sealing treatment using an aqueous solution containing an inorganic fluorine atom-containing compound, examples of such inorganic fluorine atom-containing compounds suitably used are metal fluorides.

Specific examples thereof are sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluoro-zirconic acid, fluoro-titanic acid, hexafluoro-silicic acid, nickel fluoride, iron fluoride, fluoro-phosphoric acid, and ammonium fluoro-phosphate. Among these, preferred are sodium fluorozirconate, sodium fluorotitanate, fluoro-zirconic acid and fluoro-titanic acid.

The concentration of the inorganic fluorine atom-containing compound present in the aqueous solution is preferably not less than 0.01% by weight and more preferably not less than 0.05% by weight for ensuring the sufficient sealing of the micropores present in the anodized layer; and preferably not more than 1% by weight and more preferably not more than 0.5% by weight from the viewpoint of the stain resistance.

Preferably, the aqueous solution containing an inorganic fluorine atom-containing compound further comprises a phosphoric acid salt compound. The incorporation of such a compound into the solution would permit the improvement of the hydrophilicity of the surface of the anodized layer and this in turn results in the improvement of the ability of the resulting plate to be developed on a printing machine and the stain resistance of the resulting printing plate.

Examples of such phosphoric acid salt compounds are salts of phosphoric acid with metals such as alkali metals and alkaline earth metals.

Specific examples thereof include zinc phosphate, aluminum phosphate, ammonium phosphate, di-ammonium hydrogen phosphate, ammonium di-hydrogen phosphate, mono-ammonium phosphate, mono-potassium phosphate, mono-sodium phosphate, potassium di-hydrogen phosphate, di-potassium hydrogen phosphate, calcium phosphate, ammonium sodium hydrogen phosphate, magnesium hydrogen phosphate, magnesium phosphate, ferrous phosphate, ferric phosphate, sodium di-hydrogen phosphate, sodium phosphate, di-sodium hydrogen phosphate, lead phosphate, di-ammonium phosphate, calcium di-hydrogen phosphate, lithium phosphate, phospho-tungstic acid, ammonium phospho-tungstate, sodium phospho-tungstate, ammonium phospho-molybdate, sodium phospho-molybdate, sodium phosphite, sodium tripolyphosphate, and sodium pyrophosphate. Among them, preferred are sodium di-hydrogen phosphate, di-sodium hydrogen phosphate, potassium di-hydrogen phosphate and di-potassium hydrogen phosphate.

The combination of the inorganic fluorine atom-containing compound with the phosphoric acid salt compound is not restricted to any specific one, but the aqueous solution preferably comprises at least sodium fluorozirconate as the inorganic fluorine atom-containing compound and at least sodium di-hydrogen phosphate as the phosphoric acid salt compound.

The concentration of the phosphoric acid salt compound in the aqueous solution is preferably not less than 0.01% by weight and more preferably not less than 0.1% by weight from the viewpoint of the ability of the resulting plate to be developed on a printing machine and the stain resistance of the resulting printing plate, while it is preferably not more than 20% by weight and more preferably not more than 5% by weight from the viewpoint of the solubility thereof in the solution.

The mixing ratio of the compounds in the aqueous solution is not restricted to any specific one, but the ratio (by weight) of the inorganic fluorine atom-containing compound to the phosphoric acid salt compound preferably ranges from 1/200 to 10/1 and more preferably 1/30 to 2/1.

Moreover, the temperature of the aqueous solution is preferably not less than 20° C. and more preferably not less than 40° C., while it is preferably not more than 100° C. and more preferably not more than 80° C.

In addition, the aqueous solution preferably has a pH value of not less than 1 and more preferably not less than 2, while the aqueous solution preferably has a pH value of not more than 11 and more preferably not more than 5.

The method for sealing treatment using an aqueous solution containing an inorganic fluorine atom-containing compound is not limited to any particular one and may be, for instance, a dipping method and a spraying method. These methods may be used alone once or over several times, or they may be used in any combination of at least two of them.

Among these, preferably used herein is a dipping method. When the aluminum plate is treated according to the dipping method, the treating time is preferably not less than one second and more preferably not less than 3 seconds, while it is preferably not more than 100 seconds and more preferably not more than 20 seconds.

Sealing Treatment with Water Vapor (Steam)

The sealing treatment with steam may be, for instance, one in which the aluminum plate having an anodized layer formed thereon is continuously or intermittently brought into close contact with pressurized steam or the steam under ordinary pressure.

The temperature of the steam is preferably not less than 80° C. and more preferably not less than 95° C., while it is preferably not more than 105° C.

The pressure of the steam preferably ranges from (atmospheric pressure −50 mmAq) to (atmospheric pressure+300 mmAq) ($1.008 \times 10^5$ to $1.043 \times 10^5$ Pa).

In addition, the contact time is preferably not less than one second and more preferably not less than 3 seconds, while it is preferably not more than 100 seconds and more preferably not more than 20 seconds.

Sealing Treatment with Hot Water

The sealing treatment with hot water (steam) may be, for instance, one in which the aluminum plate having an anodized layer formed thereon is dipped in hot water.

The hot water used in this treatment may comprise an inorganic salt (such as a phosphoric acid salt) or an organic salt.

The temperature of the hot water is preferably not less than 80° C. and more preferably not less than 95° C., while it is preferably not more than 100° C.

The time required for dipping the plate in hot water is preferably not less than one second and more preferably not less than 3 seconds, while it is preferably not more than 100 seconds and more preferably not more than 20 seconds.

The hydrophilization treatment used in the present invention may be, for instance, the treatment with alkali metal silicates such as those disclosed in U.S. Pat. Nos. 2,714,066, 3,181,461, 3,280,734 and 3,902,734. In this method, the treatment comprises the step of dipping a substrate in an aqueous solution of, for instance, sodium silicate or electrolyzing the substrate in such an aqueous solution. In addition to the foregoing, usable herein include, for instance, a method disclosed in J.P. KOKOKU Sho 36-22063, in which a substrate is treated with potassium fluorozirconate; and methods disclosed in U.S. Pat. Nos. 3,276,868, 4,153,461 and 4,689,272, wherein a substrate is treated with polyvinyl sulfonic acid.

The substrate usable herein preferably has a center line average surface roughness on the order of 0.10 to 1.2 μm. The use of a substrate having such an average surface roughness would permit the achievement of good adhesion to the hydrophobic images, and the good printing durability and stain resistance of the resulting printing plate.

(ii-1) Step for Discharging Ink Composition of the Present Invention onto Hydrophilic Substrate First, the ink composition of the present invention is discharged onto a hydrophilic substrate. In this step, any conventionally known ink-jet recording device can be used like the step (i-1) in the foregoing ink-jet recording method. In addition, the preferred ranges of the temperature and viscosity of the ink, as well as the methods for controlling them are the same as those used in the foregoing ink-jet recording method. The discharged amount of the ink and the size of the ink droplets used in the step (i-1) are selected in such a manner that they are well suited to the printed mattes to be formed.

(ii-2) Step for Forming Hydrophobic Images of the Ink Composition by Curing the Ink Composition Through Irradiating the Discharged Ink Composition with Activated Radiant Rays The ink composition discharged on the hydrophilic substrate is cured through the irradiation thereof with activated radiant rays. The details of this curing mechanism are the same as those described above in connection with the step (i-2) in the foregoing ink-jet recording method. In this regard, the sources of the activated radiant rays or the preferred irradiation conditions used for the curing of the ink composition are likewise the same as those used above in the step (i-2) of the foregoing ink-jet recording method.

The use of the foregoing steps would permit the formation of hydrophobic images of the cured ink composition of the present invention on the hydrophilic substrate and as a result, a lithographic printing plate can be prepared.

When preparing a lithographic printing plate while making use of the ink-jet recording method of the present invention, ink dots having a uniform diameter as determined after the impact thereof can be applied onto even a variety of substrates for the lithographic printing plates having different surface wettability and as a result, the ink-jet recording method thus permits the formation of hydrophobic images in a high precision.

Moreover, as has been described above, the ink composition of the present invention can highly sensitively be cured by the action of activated radiant rays to thus form hydrophobic areas (or hydrophobic images) excellent in the adhesion to the substrate and in the film quality.

From the foregoing, the lithographic printing plate of the present invention has high quality images and is excellent in the printing durability.

Incidentally, it is a matter of course that the ink composition of the present invention not only permits the formation of image areas of such a lithographic printing plate, but also is useful as a currently used ink composition applied to the preparation of printed matters as has been described above.

EXAMPLE

The present invention will hereunder be described in more detail with reference to the following Examples, but the present invention is not restricted to the embodiments disclosed in the following specific Examples at all.

The following Examples relate to UV ink-jet recording-ink compositions having respective colors. In the following Examples, the term "part" means "part by weight".

Example 1

The following components were stirred with a high-speed water-cooled stirring machine to thus give a UV ink-jet recording-ink composition having a cyan color.

(Cyan-Colored Ink Composition)

| Component | Amt. (part) |
|---|---|
| Polybutadiene[NISSO-PB B-1000: Component (A)] (Polybutadiene available from Nippon Soda Co., Ltd.; Number average molecular weight (Mn): 900 to 1300) | 6.0 |
| Tridecyl acrylate [SR498D available from Sartomer Company; Component (B)] | 15.0 |
| Actilane 421 [acrylate monomer (*1) available from Akcros Company; Component (B)] | 36.0 |

-continued

| Component | Amt. (part) |
|---|---|
| 2-Phenoxyethyl acrylate [available from Tokyo Kasei Kogyo Co., Ltd.; Component (B)] | 12.4 |
| Solsperse 32000 (a dispersant available from Noveon Company) | 0.4 |
| Irgalite Blue GLVO [a pigment available from Ciba Specialty Chemicals Co., Ltd.; Component (D)] | 3.6 |
| Genorad 16 (a polymerization-inhibiting agent available from Rahn Company) | 0.05 |
| Rapi-Cure DVE-3 (a vinyl ether compound (*2) available from ISP Europe Company; Component (B')) | 10.0 |
| Lucirin TPO [a photoinitiator available from BASF Company; Component (C)] | 8.5 |
| Benzophenone [a photoinitiator; Component (C)] | 4.0 |
| Irgacure 184 [a photoinitiator available from Ciba Specialty Chemicals Co., Ltd.; Component (C)] | 4.0 |
| Byk 307 (an antifoaming agent available from BYK Chemie Company) | 0.05 |

(*1): Actilane 421 is a propoxy-modified neopentyl glycol diacrylate (a bifunctional acrylate).
(*2): Rapi-Cure DVE-3 is a vinyl ether-containing polymerizable monomer.

(Evaluation of Ink)

Images were formed by printing a sheet of polyvinyl chloride with the resulting magenta-colored ink composition, then the sheet was passed through a region at a speed of 40 m/min while irradiating, within the region, the sheet with the light rays emitted from an iron-doped ultraviolet light-emitting lamp (power: 120 W/cm$^2$) to cure the ink composition and to thus give a printed matter.

At this stage, the sheet was inspected for the following characteristic properties:

<Sensitivity to Cure>

The exposed light energy used in the curing operation was determined using a luminous energy accumulator (UV PowerMAP available from EIT Company). In this respect, the sheet was evaluated as follows: the smaller the numerical value thus obtained, the higher the sensitivity of the sheet or the image thus formed to the exposed light. As a result, the accumulated quantity of the light rays exposed on the sheet surface was found to be about 330 mJ/cm$^2$, for the ink composition of Example 1. It was thus confirmed that the ink composition of Example 1 was cured at a high sensitivity.

<Curability>

The curability was evaluated as follows: the ink composition applied onto a substrate for printing was irradiated with ultraviolet light rays at an accumulated quantity of light rays exposed on the sheet surface of about 330 mJ/cm$^2$ to thus cure the same, followed by the evaluation of the curability of the image area formed after the curing according to the examination by touch. In this respect, the curability was evaluated by the determination of whether, or not, the surface of the cured film was adhesive.

It was thus confirmed that the adhesiveness of the image area was completely eliminated after the cure thereof and that the ink composition was excellent in the curability.

<Adhesion of Ink Composition to Recording Medium>

The adhesion of the ink composition to a recording medium was evaluated according to the cross-hatch test (as defined in EN ISO2409) and classified on the basis of the criteria 5B to 1B according to the method specified in ASTM. In this respect, the sample having the highest adhesion is classified as the rank 5B and samples having practically acceptable adhesion are those classified as the rank 3B or higher.

As a result, the ink composition of Example 1 was found to be highly adhesive or it was classified as the rank 4B according to the foregoing ASTM classification.

<Flexibility>

The flexibility was evaluated by determining the degree of crack formation observed for each cured film after a sheet carrying images of ink was bent over 10 times. In this bending test, the results are evaluated on the basis of the 5-stage evaluation criteria, in which the condition completely free of any crack is defined to be or classified as the stage 5 and samples in practically acceptable crack-forming conditions are classified as the stage 3 or higher.

As a result, the ink composition of Example 1 was found to be only slightly cracked to such an extent that the cracks never adversely affected the desired characteristic properties of the printed images and it was evaluated to be classified as the stage 3.

Example 2

The following components were stirred with a high-speed water-cooled stirring machine to thus give a UV ink-jet recording-ink composition having a magenta color.

(Magenta-Colored Ink Composition)

| Component | Amt. (part) |
| --- | --- |
| Polybutadiene[NISSO-PB B-2000: Component (A)] (Polybutadiene available from Nippon Soda Co., Ltd.; Number average molecular weight (Mn): 1800 to 2200) | 3.0 |
| Tridecyl acrylate [SR498D available from Sartomer Company; Component (B)] | 18.0 |
| Actilane 421 [acrylate monomer available from Akcros Company; Component (B)] | 34.4 |
| 2-Phenoxyethyl acrylate [available from Tokyo Kasei Kogyo Co., Ltd.; Component (B)] | 16.0 |
| Solsperse 32000 (a dispersant available from Noveon Company) | 0.4 |
| Cinquasia Magenta RT-355D [a pigment available from Ciba Specialty Chemicals Co., Ltd.; Component (D)] | 3.6 |
| Genorad 16 (a polymerization-inhibiting agent available from Rahn Company) | 0.05 |
| Rapi-Cure DVE-3 (a vinyl ether compound available from ISP Europe Company; Component (B')) | 8.0 |
| Lucirin TPO [a photoinitiator available from BASF Company; Component (C)] | 8.5 |
| Benzophenone [a photoinitiator; Component (C)] | 4.0 |
| Irgacure 184 [a photoinitiator available from Ciba Specialty Chemicals Co., Ltd.; Component (C)] | 4.0 |
| Byk 307 (an antifoaming agent available from BYK Chemie Company) | 0.05 |

Images were formed by printing a sheet of polyvinyl chloride with the resulting magenta-colored ink composition, then the sheet was passed through a region at a speed of 40 m/min while irradiating, within the region, the sheet with the light rays emitted from an iron-doped ultraviolet light-emitting lamp (power: 120 W/cm$^2$). The resulting printed matter obtained using the ink composition was inspected for the various characteristic properties according to the same procedures used in Example 1. The results thus obtained are summarized in the following Table 1.

Example 3

The following components were stirred with a high-speed water-cooled stirring machine to thus give a UV ink-jet recording-ink composition having a yellow color.

(Yellow-Colored Ink Composition)

| Component | Amt. (part) |
| --- | --- |
| Polybutadiene[NISSO-PB B-1000: Component (A)] | 4.0 |
| Tridecyl acrylate [SR498D available from Sartomer Company; Component (B)] | 15.0 |
| Actilane 421 [the foregoing acrylate monomer available from Akcros Company; Component (B)] | 35.4 |
| 2-Phenoxyethyl acrylate [available from Tokyo Kasei Kogyo Co., Ltd.; Component (B)] | 17.0 |
| Solsperse 32000 (a dispersant available from Noveon Company) | 0.4 |
| Cromophtal Yellow LA [a pigment available from Ciba Specialty Chemicals Co., Ltd.; Component (D)] | 3.6 |
| Genorad 16 (a polymerization-inhibiting agent available from Rahn Company) | 0.05 |
| Rapi-Cure DVE-3 (a vinyl ether compound available from ISP Europe Company; Component (B')) | 6.0 |
| Lucirin TPO [a photoinitiator available from BASF Company; Component (C)] | 8.5 |
| Benzophenone [a photoinitiator; Component (C)] | 4.0 |
| Irgacure 184 [a photoinitiator available from Ciba Specialty Chemicals Co., Ltd.; Component (C)] | 4.0 |
| Byk 307 (an antifoaming agent available from BYK Chemie Company) | 0.05 |

Images were formed by printing a sheet of polyvinyl chloride with the resulting yellow-colored ink composition, then the sheet was passed through a region at a speed of 40 m/min while irradiating, within the region, the sheet with the light rays emitted from an iron-doped ultraviolet light-emitting lamp (power: 120 W/cm$^2$). The resulting printed matter obtained using the ink composition was inspected for the various characteristic properties according to the same procedures used in Example 1. The results thus obtained are summarized in the following Table 1.

Example 4

The following components were stirred with a high-speed water-cooled stirring machine to thus give a UV ink-jet recording-ink composition having a black color.

(Black-Colored Ink Composition)

| Component | Amt. (part) |
| --- | --- |
| Polybutadiene[NISSO-PB B-1000: Component (A)] | 5.0 |
| Tridecyl acrylate [SR498D available from Sartomer Company; Component (B)] | 16.0 |
| Actilane 421 [the foregoing acrylate monomer available from Akcros Company; Component (B)] | 36.4 |
| 2-Phenoxyethyl acrylate [available from Tokyo Kasei Kogyo Co., Ltd.; Component (B)] | 16.0 |
| Solsperse 32000 (a dispersant available from Noveon Company) | 0.4 |
| Microlith Black C-K [a pigment available from Ciba Specialty Chemicals Co., Ltd.; Component (D)] | 2.6 |
| Genorad 16 (a polymerization-inhibiting agent available from Rahn Company) | 0.05 |
| Rapi-Cure DVE-3 (a vinyl ether compound available from ISP Europe Company; Component (B')) | 7.0 |
| Lucirin TPO [a photoinitiator available from BASF Company; Component (C)] | 8.5 |
| Benzophenone [a photoinitiator; Component (C)] | 4.0 |
| Irgacure 184 [a photoinitiator available from Ciba Specialty Chemicals Co., Ltd.; Component (C)] | 4.0 |
| Byk 307 (an antifoaming agent available from BYK Chemie Company) | 0.05 |

Images were formed by printing a sheet of polyvinyl chloride with the resulting black-colored ink composition, then the sheet was passed through a region at a speed of 40 m/min while irradiating, within the region, the sheet with the light rays emitted from an iron-doped ultraviolet light-emitting lamp (power: 120 W/Cm$^2$). The resulting printed matter obtained using the ink composition was inspected for the various characteristic properties according to the same procedures used in Example 1. The results thus obtained are summarized in the following Table 1.

Comparative Example 1

The following components were stirred with a high-speed water-cooled stirring machine to thus give a UV ink-jet recording-ink composition having a cyan color.

(Cyan-Colored Ink Composition)

| Component | Amt. (part) |
|---|---|
| Tridecyl acrylate [SR498D available from Sartomer Company; Component (B)] | 15.0 |
| Actilane 421 [an acrylate monomer available from Akcros Company; Component (B)] | 42.0 |
| 2-Phenoxyethyl acrylate [available from Tokyo Kasei Kogyo Co., Ltd.; Component (B)] | 12.4 |
| Solsperse 32000 (a dispersant available from Noveon Company) | 0.4 |
| Irgalite Blue GLVO [a pigment available from Ciba Specialty Chemicals Co., Ltd.; Component (D)] | 3.6 |
| Genorad 16 (a polymerization-inhibiting agent available from Rahn Company) | 0.05 |
| Rapi-Cure DVE-3 (a vinyl ether compound available from ISP Europe Company; Component (B')) | 10.0 |
| Lucirin TPO [a photoinitiator available from BASF Company; Component (C)] | 8.5 |
| Benzophenone [a photoinitiator; Component (C)] | 4.0 |
| Irgacure 184 [a photoinitiator available from Ciba Specialty Chemicals Co., Ltd.; Component (C)] | 4.0 |
| Byk 307 (an antifoaming agent available from BYK Chemie Company) | 0.05 |

Images were formed by printing a sheet of polyvinyl chloride with the resulting cyan-colored ink composition, then the sheet was passed through a region at a speed of 40 m/min while irradiating, within the region, the sheet with the light rays emitted from an iron-doped ultraviolet light-emitting lamp (power: 120 W/cm$^2$). The resulting printed matter obtained using the ink composition was inspected for the various characteristic properties according to the same procedures used in Example 1. The results thus obtained are summarized in the following Table 1.

TABLE 1

| Ex. No. | Curability | Adhesiveness | Flexibility |
|---|---|---|---|
| 1 | Good | 4B | 4 |
| 2 | Good | 3B | 3 |
| 3 | Good | 3B | 3 |
| 4 | Good | 3B | 4 |
| Comparative Ex. | | | |
| 1 | Good | 2B | 1 |

As will be clear from the results listed in the foregoing Table 1, the ink compositions according to the present invention, each of which comprise, as polymerizable compounds, polybutadiene and a (meth)acryloyl group-containing compound, are excellent in the curability, adhesiveness and flexibility, while it is confirmed that the ink composition free of any allyl group (the ink composition of Comparative Example 1) is excellent in the curability, but it is inferior in the both adhesiveness and flexibility.

Example 5

(Preparation of Substrate)

A molten metal was prepared using an aluminum alloy comprising 0.06% by weight of Si, 0.30% by weight of Fe, 0.025% by weight of Cu, 0.001% by weight of Mn, 0.001% by weight of Mg, 0.001% by weight of Zn, 0.03% by weight of Ti and the balance of Al and inevitable contaminants, followed by the pre-treatment and filtration of the molten metal and the subsequent formation of an ingot having a thickness of 500 mm and a width of 1200 mm according to the DC casting technique. The surface of the ingot was treated with a facing attachment to an average thickness of 10 mm, the ingot was then maintained at a constant temperature of 550° C. over about 5 hours (soaking) and after the temperature of the ingot was reduced down to 400° C., it was treated with a hot-pressing device to thus form a rolled plate having a thickness of 2.7 mm. The resulting rolled plate was further subjected to a heat treatment at 500° C. using a continuous annealing device, and thereafter it was subjected to a cold-rolling treatment to a thickness of 0.24 mm to thus give an aluminum plate of JIS 1050 material. At this stage, the minor diameter of the average grain size of the resulting aluminum plate was found to be 50 μm, while the major diameter thereof was found to be 300 μm. This aluminum plate was cut into articles each having a width of 1030 mm and then subjected to the following surface treatments to thus give an aluminum substrate.

<Surface Treatments>

The aluminum plate was continuously subjected to the following treatments (a) to (j) as the surface treatments. In this connection, the liquid adhered to the aluminum plate was squeezed out with a nip rollers after each of the surface treating and water-washing steps was completed.

(a) Mechanical Surface-Roughening Treatment

The aluminum plate was mechanically surface-roughened with rotating roller-like nylon brushes while supplying, to the surface of the plate, a suspension comprising an abrasive having a specific gravity of 1.12 (pumice) and water as a liquid polishing slurry. The average particle size of the abrasive was found to be 30 μm and the maximum particle size thereof was found to be 100 μm. The nylon brush was made of 6·10 nylon, and the bristles thereof had a length of 45 mm and a diameter of 0.3 mm. The nylon brush was produced by planting such bristles in holes formed on a stainless steel cylinder having a diameter φ of 300 mm in a high density. Three such rotating brushes were used in this treatment. The distance between the two support-rollers (φ:200 mm) arranged below the brushes was set at 300 mm. The rollers equipped with brushes were pressed against the aluminum plate till the load of the driving motor for rotating the brushes was 7 kW higher than the load thereof observed before the brushes were pressed against the plate. The rotational direction of the brushes was identical to that along which the aluminum plate was conveyed. The rotational number of the brushes was set at 200 rpm.

(b) Alkali-Etching Treatment

The aluminum plate obtained above was subjected to an etching treatment by spraying the plate with an aqueous solution having a sodium hydroxide concentration of 2.6% by weight and an aluminum ion concentration of 6.5% by weight maintained at a temperature of 70° C. so that 10 g/m² of the aluminum plate was thus dissolved out. Thereafter, the plate was washed by spraying the same with water.

(c) Desmutting Treatment

The aluminum plate was subjected to a desmutting treatment by spraying the same with a 1% by weight nitric acid aqueous solution (containing 0.5% by weight of aluminum ions) maintained at 30° C. and then the plate was washed by spraying water on the aluminum plate. The nitric acid aqueous solution used for the desmutting treatment was the waste liquid obtained in the step for the electrochemical surface-roughening treatment (as will be detailed below), which was carried out in an aqueous nitric acid solution using an alternating current.

(d) Electrochemical Surface-Roughening Treatment

The aluminum plate was then subjected to a continuous electrochemical surface-roughening treatment using an AC voltage of 60 Hz. At this stage, the electrolyte used was a 10.5 g/L nitric acid aqueous solution (containing 5 g/L of aluminum ions and 0.007% by weight of ammonium ions) and the temperature of the electrolyte was set at 50° C. The electrochemical surface-roughening treatment was carried out using, as the AC power source, an alternating current having a trapezoidal rectangular-shaped wave form, whose duty ratio was found to be 1:1 and which required 0.8 msec till it reached its peak level from the current value of zero, and likewise using a carbon electrode as a counter electrode. A ferrite electrode was used as an auxiliary electrode.

The current density was 30 A/dm² as expressed in terms of the peak value thereof, the quantity of electricity was 220 C/dm² as expressed in terms of the sum of the electricity at the anode time of the aluminum plate. A current of 5% of the total current branched from the power source was passed through the auxiliary electrode. Thereafter, the plate was washed by spraying the same with water.

(e) Alkali-Etching Treatment

The aluminum plate was subjected to an etching treatment at a temperature of 32° C. by spraying the plate with an aqueous solution having a sodium hydroxide concentration of 26% by weight and an aluminum ion concentration of 6.5% by weight so as to dissolve out 0.50 g/m² of the aluminum plate and to thus remove the smutted components mainly comprising aluminum hydroxide generated during the electrochemical surface-roughening treatment carried out in the preceding step using an alternating current and to make the edge portions of the generated pits smooth through the dissolution of the edge portions. Thereafter, the plate was washed by spraying the same with water.

(f) Desmutting Treatment

The aluminum plate was subjected to a desmutting treatment by spraying the same with a 15% by weight nitric acid aqueous solution (containing 4.5% by weight of aluminum ions) maintained at 30° C. and then the plate was washed by spraying water on the aluminum plate. The nitric acid aqueous solution used for the desmutting treatment was the waste liquid obtained in the step for the electrochemical surface-roughening treatment, which was carried out in an aqueous nitric acid solution using an alternating current.

(g) Electrochemical Surface-Roughening Treatment

The aluminum plate was then subjected to a continuous electrochemical surface-roughening treatment using an AC voltage of 60 Hz. At this stage, the electrolyte used was a 5.0 g/L hydrochloric acid aqueous solution (containing 5 g/L of aluminum ions) and the temperature of the electrolyte was set at 35° C. The electrochemical surface-roughening treatment was carried out using, as the AC power source, an alternating current having a trapezoidal rectangular-shaped wave form, whose duty ratio was found to be 1:1 and which required 0.8 msec till it reached its peak level from the current value of zero, and likewise using a carbon electrode as a counter electrode. A ferrite electrode was used as an auxiliary electrode.

The current density was 25 A/dm² as expressed in terms of the peak value thereof, the quantity of electricity was 50 C/dm² as expressed in terms of the sum of the electricity at the anode time of the aluminum plate. Thereafter, the plate was washed by spraying the same with water.

(h) Alkali-Etching Treatment

The aluminum plate was subjected to an etching treatment at a temperature of 32° C. by spraying the plate with an aqueous solution having a sodium hydroxide concentration of 26% by weight and an aluminum ion concentration of 6.5% by weight so as to dissolve out 0.12 g/m² of the aluminum plate and to thus remove the smutted components mainly comprising aluminum hydroxide generated during the electrochemical surface-roughening treatment carried out in the preceding step using an alternating current and to make the edge portions of the generated pits smooth through the dissolution of the edge portions. Thereafter, the plate was washed by spraying the same with water.

(i) Desmutting Treatment

The aluminum plate was subjected to a desmutting treatment by spraying the same with a 25% by weight sulfuric acid aqueous solution (containing 0.5% by weight of aluminum ions) maintained at 60° C. and then the plate was washed by spraying water on the aluminum plate.

(j) Anodization Treatment

The plate was subjected to an anodization treatment using an anodization apparatus (each of the lengths of first and second electrolyzation zones: 6 m; each of the lengths of first and second power supply zones: 3 m. A sulfuric acid solution was used as the electrolyte to be supplied to the first and second electrolyzation zones. The respective electrolytes were sulfuric acid aqueous solutions each having a sulfuric acid concentration of 50 g/L (containing 0.5% by weight of aluminum ions) and they were maintained at 20° C. Thereafter, the plate was washed by spraying the same with water. The amount of the anodized layer finally formed was found to be 2.7 g/m².

(Preparation and Evaluation of Lithographic Printing Plate)

Letters were printed on the aluminum substrate prepared above using the ink composition of Example 1 and images were formed thereon and cured according to the same procedures used in Examples 1.

The resulting printed aluminum plate was used as a lithographic printing plate and the latter was inspected for the images and the printing durability thereof according to the following methods:

<Evaluation of Images>

The lithographic printing plate prepared using the ink composition of Example 1 was fitted to Hidel KOR-D Printing Press and an ink (VALUES-G Beni (Red) for sheet paper, available from Dainippon Ink and Chemicals, Inc.) and dampening water (Ecolity 2 available from Fuji Photo Film Co., Ltd.) to thus carry out printing operations. The printed matter obtained subsequent to the hundredth printed matter was visually examined for the evaluation thereof. As a result, the printed matter was found to have excellent images free of any unprinted image area (white marks) and free of any contaminated portion on the non-image area.

<Evaluation of Printing Durability>

The printing operation was further continued without any interruption thereof. As a result, not less than 5,000 printed matters were obtained, each of which carried high quality images free of any unprinted image area and free of any contaminated portion on the non-image area. Thus, it was confirmed that the lithographic printing plate of the present invention also had an excellent printing durability of the practically acceptable level.

The foregoing results clearly indicate that the lithographic printing plate whose images are formed from the ink composition of the present invention has high quality images, and can ensure excellent printing durability and that the ink composition of the present invention can suitably be used in the preparation of lithographic printing plates.

What is claimed is:

1. An ink-jet ink composition comprising (A) a polybutadiene; (B) a radical polymerizable compound having a (meth) acryloyl group; (C) a radical polymerization initiator; and (D) a colorant, wherein the polybutadiene (A) has a repeating unit represented by the following general formula (I):

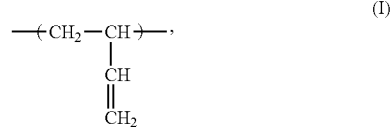

wherein the terminal structure of the polybutadiene (A) is a hydrogen atom, a carboxyl group, a hydroxyethyl group or an isocyanate group, wherein the content of the polybutadiene (A) in the ink composition ranges from 2 to 25% by weight, wherein the polybutadiene (A) has a number average molecular weight ranging from about 500 to about 10,000, and wherein the ink-jet ink composition has a viscosity value as determined at the temperature for discharging the ink composition ranging from 7 to 30 mPa·s.

2. The ink-jet ink composition as set forth in claim 1, wherein the polybutadiene (A) comprises the repeating unit represented by general formula (I) and wherein a percentage of said repeating unit represented by general formula (I) in the polybutadiene (A) is not less than 15% of all repeating units present in the polybutadiene (A).

3. An ink-jet recording method comprising the steps of (i-1) discharging the ink composition as set forth in claim 1 onto the surface of a recording medium, and (i-2) irradiating the discharged ink composition with activated radiant rays to thus cure the ink composition.

4. A method for the preparation of a lithographic printing plate comprising the steps of (ii-1) discharging the ink composition as set forth in claim 1 onto the surface of a hydrophilic substrate, and (ii-2) curing the discharged ink composition through the irradiation thereof with activated radiant rays to thus form hydrophobic images consisting of the cured ink composition on the foregoing hydrophilic substrate.

5. A lithographic printing plate comprising hydrophobic regions formed by discharging the ink composition as set forth in claim 1 onto the surface of a hydrophilic substrate and then curing the discharged ink composition through the irradiation with activated radiant rays.

6. The ink-jet ink composition of claim 1, comprising organic solvent ranging from 0.1 to 5% by weight.

7. The ink-jet composition of claim 1, wherein the terminal structure of the polybutadiene (A) is a hydrogen atom.

* * * * *